United States Patent [19]

Black et al.

[11] Patent Number: 4,619,772

[45] Date of Patent: Oct. 28, 1986

[54] METHOD AND MATERIAL FOR INCREASING VISCOSITY AND CONTROLLING OF OIL WELL DRILLING AND WORK-OVER FLUIDS

[76] Inventors: James K. Black, 2114 12th Ave. W.; Wesley F. Black, 2615 19th Ave. W., both of Williston, N. Dak. 58801

[21] Appl. No.: 497,210

[22] Filed: May 23, 1982

[51] Int. Cl.$^4$ ............................................... C09K 7/02
[52] U.S. Cl. ............................. 252/8.514; 252/8.51; 252/8.512
[58] Field of Search .......... 252/8.5 C, 8.5 A, 8.5 LC; 241/6; 127/32, 67

[56] References Cited

U.S. PATENT DOCUMENTS

| | | | |
|---|---|---|---|
| 2,209,591 | 7/1940 | Barnes | 252/8.5 |
| 2,417,307 | 3/1947 | Larsen | 252/8.5 |
| 2,600,404 | 6/1952 | Hoeppel | 252/8.5 |
| 2,908,597 | 10/1959 | Owen | 252/8.5 |
| 3,872,018 | 3/1975 | Alexander | 252/8.5 |

OTHER PUBLICATIONS

Rogers, *Composition and Properties of Oil Well Drilling Fluids*, Revised Ed., Pub. 1953, pp. 406–410.

*Primary Examiner*—Herbert B. Guynn
*Attorney, Agent, or Firm*—James R. Young

[57] ABSTRACT

A well drilling fluid additive for viscosifying and controlling filtration or water loss from the fluid matrix is comprised of ground durum derived from the outer portion of the endosperm of the durum kernel. This product is very high in protein and polysaccharides, in addition to starch, which not only results in excellent viscosity and filtration control characteristics, but also in ability to maintain such characteristics in high temperature and pressure environments. It is equally effective in mineral-contaminated water, salt water, and fresh water, and it eliminates the necessity of flocculating or expanding clays in drilling fluid matrices for most normal oil well drilling applications. In normal use, this additive is mixed with the drilling fluid at a cool temperature in order to achieve maximum uniform dispersion. It is then circulated into the well where subsurface formation temperatures heat the fluid to at least 175° to 180° F., whereupon it "yields" or thickens into a very viscous fluid.

11 Claims, 2 Drawing Figures

METHOD AND MATERIAL FOR INCREASING VISCOSITY AND CONTROLLING OF OIL WELL DRILLING AND WORK-OVER FLUIDS

BACKGROUND OF THE INVENTION

The present invention is related to well drilling fluid additives, and more specifically, to an improved material additive for increasing viscosity and controlling filtration in well drilling and work-over fluids and method of using same.

Oil and gas well drilling and work-over operations usually require the use of a heavy fluid, such as drilling mud or salt water brine, to control reservoir pressure and to carry drill bit cuttings and debris out of the well bore. The hydrostatic head of the fluid in the well must be sufficient to offset the reservoir pressure to prevent blow outs. Drilling mud is usually a fresh water or salt water base fluid. The most common principal ingredient in drilling mud for adding weight to the fluid to increase the hydrostatic head is barite or barium sulfate, which is a naturally occurring insoluble mineral.

In order to keep the barite evenly dispersed in suspension in the drilling fluid, as well as to carry drill bit cuttings and debris out of the well bore, it is necessary to increase the viscosity of the drilling fluid. Two of the most common viscosifiers used in drilling fluids are clays, such as bentonite or attapulgite, which flocculate or expand in water, or starch, which gelatinizes when heated in water. Starches can also be pre-gelatinized, as described in U.S. Pat. No. 2,417,307, issued to D. Larson. Corn starch is the most common starch product used because of its availability, although it is known that starches derived from other cereal grains and vegetables can also be used, as described in the D. Larson patent.

While starches are generally readily available and inexpensive, there are a number of problems associated with the use of conventional starch as a drilling fluid viscosifier agent. For example, starches are comprised of distinct granules which swell when heated to result in the desired increase in viscosity. As temperature continues to increase, however, the swelled granules eventually start to break down. This retrogradation of the starch causes it to turn into a mush with significantly reduced viscosity. Therefore, temperature control is a significant requirement in maintaining the viscosity effectiveness of starch as a drilling fluid viscosifier, yet there is very little temperature control available when drilling into underground formations.

Starch is also very vulnerable to consumption by organic organisms, which can also result in significant loss of viscosity. Since such organisms multiply very rapidly, a drilling fluid viscosified by starch can lose its viscosity very quickly. Although this problem can be controlled by adding preservatives, such as formaldehyde, to the drilling fluid, it must be monitored vigilantly.

Another problem encountered in the use of starch, especially pre-gelatinized starch, as a drilling fluid additive, is that it coagulates very rapidly upon contact with water. This action results in many large and small globules of unhydrated starch surrounded by a layer of water impermeable coagulated starch, which are almost impossible to break down and which prevent the starch inside these globules from effective use. Even mechanical mixers and agitators are not totally effective to break down these globules and disperse the starch uniformly throughout the drilling fluid medium. Consequently, approximately twenty percent (20%) of the starch added to drilling fluid is not hydrated and is not effectively utilized as a viscosifier. Such inefficiency, of course, increases cost and is undesirable.

Another problem that must be controlled in drilling fluids is the loss of water from the drilling fluid matrix into porous ground formations or reservoirs during drilling or well work-over operations. A rapid loss of water into a formation can decrease the hydrostatic head and put the well in jeopardy of a blow out. Also, introduction of water, especially fresh water, into some reservoir formations can cause water sensitive native clays in the reservoir to swell and inhibit flow of hydrocarbons into the well bore. Further, although not as serious, a significant loss of water from the drilling fluid would require a large water source and excessive water hauling and pumping, labor, and equipment to keep the well bore full and the hydrostatic head up to a safe level.

Generally, starch has been at least somewhat effective in controlling filtration, as well as viscosifying the drilling fluid, whereas the clays used for viscosifiers, such as bentonite and attapulgite, are not very effective in filtration control. When clays are used as viscosifying agents, some starch or other filtration control agent must be added to prevent excessive water loss from the drilling fluid matrix.

In recent years, some effective synthetic polymers and floculents have been developed to control filtration when used in combination with the clay viscosifying agents. In some situations, these synthetic polymer additives are superior to the starch products that in the past were commonly used. For example, such new synthetic polymers are not as sensitive to temperature ranges and organic organisms, such as bacteria, which can cause starch products to lose viscosity and filtration control properties. Consequently, the use of starch as a viscosifying and filtration control agent has been replaced in some well drilling operations by the combination of bentonite or attapulgite clays with synthetic polymer filtration control agents, such as "Drispak ™," manufactured and sold by Drilling Specialties.

There are also some problems associated with the use of clays and synthetic polymers in drilling fluids. For example, the synthetic polymers are far more expensive than starch products. Also, it is often undesirable to expose some reservoir formations to bentonite or attapulgite clay solids which can permanently clog or plug the formation around the well bore, thus inhibiting the flow of hydrocarbons from the reservoir formation into the well bore. Further, some formations already contain expandable native clays which tend to swell and clog the formation around the well bore upon being exposed to water, particularly fresh water. When such reservoirs are encountered, it is desirable to use a salt water base mud, rather than a fresh water base mud, to minimize damage to the formation. There are also drilling locations where salt water is abundant, but adequate quantities of fresh water are not readily available, so it is desirable to use salt water based drilling fluid for this reason also.

The clay viscosifiers, however, do not expand or flocculate as effectively in salt water as they do in fresh water. It is not unusual for clays to require as long as twelve hours or more to flocculate or "yield" after they have been added to a salt water drilling system which decreases the drilling fluid system efficiency and can increase the cost significantly. It is undesirable and excessively expensive to shut down drilling operations for such a long period of time while waiting for clay additives to flocculate or yield, and it is also an undesirable expense to provide premixing and agitating tanks of sufficient volume at the well site to flocculate the clays prior to adding them to the drilling fluid system.

It is equally undesirable, however, to simply add the unflocculated clay to the drilling fluid medium during drilling operations without waiting a sufficient time for flocculation or yield. Such unflocculated clay particles can enter into interstices in an oil or gas bearing formation relatively easily and then subsequently flocculate or expand to clog the formation and inhibit production of oil or gas therefrom. Also, it is usually necessary to increase viscosity during drill stem testing of a formtion in order to hold suspended solids in the drillling fluid matrix while the drilling fluid is not being circulated. A wait of twelve hours or more for the added clays to flocculate or yield to increase the viscosity is undesirable. Further, when decreased viscosity is desired, such as after drill stem testing, it is difficult to control filtration while decreasing viscosity when clays are used for a viscosifier because the clays have no capacity to control filtration. Another undesirable effect of the use of clays in a drilling fluid system is that clays are abrasive and cause excessive wear in mechanically moving parts, such as in pumps, valves, and the like.

Therefore, there remains a need for an inexpensive method and material for viscosifying and controlling filtration in drilling fluids that is easy to use and more stable and efficient than conventional starch in varying temperatures in environmental conditions, yet more effective in salt water based drilling fluid than clays and synthetic polymers and not damaging to reservoir formations.

SUMMARY OF THE INVENTION

Accordingly, it is an object of the present invention to provide a method and material for viscosifying drilling fluids and controlling filtration that is effective in salt water based drilling fluids, stable in varying temperature ranges and environmental conditions, and inexpensive.

It is also an object of the present invention to provide a viscosifier and filtration control agent that is easy to handle and will disperse uniformly and efficiently in a drilling fluid medium.

Another object of the present invention is to provide a method and material for viscosifying and controlling filtration in drilling fluid while not exposing reservoir formations to additional clay solids.

A further object of the present invention is to provide a method and material for viscosifying and controlling filtration in drilling fluids that meet the objects listed above and also have a good lubricity and is not abrasive to metallic parts.

Another object of the present invention is to provide a method and material for viscosifying and controlling filtration in well drilling fluids, such as salt water based mud systems, wherein contamination is high and clay viscosifiers are inefficient and slow to yield.

A still further object of the present invention is to provide a method and material for viscosifying and controlling filtration in drilling mud that is inexpensive and effective in salt water based drilling fluids, having a short yield time and high rheometric flow property carrying capacity, yet which is more resistent to degradation due to temperature increases and attack by organic organisms than conventional starch.

Another object of the present invention is to provide a method and material for viscosifying and controlling filtration in drilling fluids wherein viscosity can be decreased by adding water with only minimal effect on filtration control.

Still another object of the present invention is to provide a method and material for viscosifying and controlling filtration in drilling fluid that meets the objects listed above and wherein clays are not required and can be eliminated from the drilling fluid system.

The drilling fluid additive of the present invention is comprised primarily of ground durum, which upon yielding or swelling, is effective to increase the viscosity of both fresh water and salt water drilling fluid systems and is also effective in controlling filtration in such drilling fluid systems. Preferably, the material is comprised of approximately the outer thirteen percent (13%) of the endosperm portion of a durum kernel derived from the location just under the bran portion, which is higher in protein and lower in starch content than the remaining portion of the endosperm. In the preferred method of using this well drilling fluid additive, the material is mixed with the drilling fluid in its unyielded state whereupon good uniform dispersion of the material in the drilling fluid matrix is easily accomplished and then circulated into the well bore. Upon being exposed to the high temperatures encountered in subsurface reservoir formations, the material will yield or thicken to produce an effective viscosifier and filtration control agent for the drilling fluid matrix.

These and other objects, advantages, and features of the present invention will become more readily appreciated and understood when taken together with the following detailed description in conjunction with the accompanying drawings, in which:

DESCRIPTION OF THE PREFERRED EMBODIMENT

Figure 1:
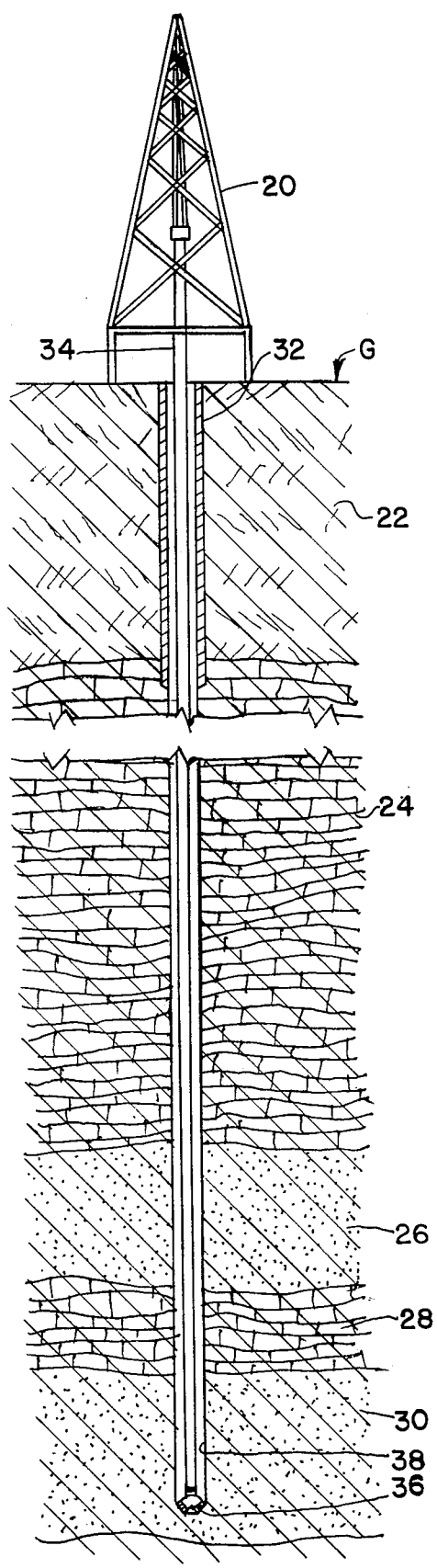
FIG. 1 is a schematic view and cross section of an oil well in a geological formation.

The oil well drilling fluid additive for increasing viscosity and controlling filtration in well drilling and work-over fluids according to the present invention is comprised of a fine ground durum flour. Preferably the material is milled through at least a 100-mesh screen and is derived from approximately the outer thirteen percent (13%) of the endosperm portion just under the bran of the durum kernels in order to obtain the most effective viscosity and filtration control parameters. In a conventional oil well drilling operation, as illustrated in the schematic diagram in FIG. 1, a drilling rig 20 is used to handle and rotate a drill pipe string 34 with a cutting tool or bit 36 on the lower end thereof for boring a well hole 38 from the surface of the ground G into a subsurface oil or gas bearing formation, such as those indicated at 26 and 30. In order to protect surface water from contamination, a surface casing 32 must be set in the unconsolidated soil adjacent the surface of the ground G. Then, the well is bored through the bed rock 24 and through whatever subsurface geological structures or formations are encountered to reach the subsurface oil or gas bearing formations far below the surface of the ground. It is not unusual for oil producing regions to have several layers of oil and gas bearing formations or zones, such as those indicated as 26 and 30, separated by rock or shale layers 28. It is a common practice to drill the well through one or more oil or gas bearing formations 26 that are capable of commercial production in order to reach additional deeper oil and gas bearing formations 30. Then, the oil and gas is produced out of the lower formation 30 first, and when that is depleted, the lower portion of the well is plugged and the well is recompleted into the higher formation 26 to produce the oil and gas out of that zone. Therefore, it is necessary to protect the upper zone 26 from damage that could inhibit production while the well is drilled through that zone and into lower zones.

As the well is drilled, a fluid matrix, commonly referred to as drilling mud, is constantly circulated through the well bore for controlling reservoir pressures encountered in the well and for carrying cuttings and debris produced by the cutting tool 36 out of the well for disposal on the surface. In order to effect such circulation, the drilling fluid is usually pumped from the surface of the well downwardly through the drilling pipe 34 and through ports in the cutting tool 36 at the bottom of the drill string 34 and then flows back upwardly through the annulus of the well bore 38 around the outside of the drill pipe 34 back to the surface again. On the surface, the drilling fluid is run over a series of screens, called shakers, which separate the cuttings and debris from the drilling fluid for disposal.

It is usually preferable to use a salt water base for the drilling fluid matrix because native clay particles which often exist in oil and gas producing formations are not as susceptible to swelling, expansion, or flocculation in salt water as in a fresh water. Also, in many oil producing areas, it is not uncommon to encounter one or more layers of salt above the oil bearing formation. If the water base of the drilling fluid matrix is not fully saturated with salt or other minerals, such salt layers or formations will be dissolved by the drilling fluid resulting in large caverns being washed out around the well bore. Such washouts or caverns in these salt layers make it virtually impossible to satisfactorily cement the casing around the well bore in a manner which will protect the well bore from collapse. Therefore, a salt water based drilling fluid is much more desirable in most circumstances than a fresh water based drilling fluid.

Furthermore, in order to control high pressure subsurface reservoirs, it is often necessary to weight the drilling fluid in order to increase the hydrostatic head of the drilling fluid in the well bore to control such reservoir pressures and keep the well from blowing out. Such weighting is usually accomplished by adding barium sulfate or barite to the drilling fluid matrix. In order to hold the barite in uniformly dispersed suspension in the drilling fluid matrix, the viscosity of the drilling fluid must be in the range of at least 38 to 40 seconds per quart A.P.I. When drilling into lower pressure reservoirs where barite is not required for weighting the fluid, the drilling fluid matrix must still be sufficiently viscous to carry the cuttings and debris out of the well bore.

In addition to the viscosity requirements, the drilling fluid matrix must have sufficient filtration control to prevent significant losses of water from the drilling fluid matrix into the formation surrounding the well bore. During drilling operations, while the drilling fluid is being constantly circulated through the well, as described above, more water loss can be tolerated than during times when continuous circulation is not possible and the fluid stands static in the well bore. For example, when the drill pipe string is being tripped out of the hole, th change the cutting tool, or during drill stem testing, the water column in the well bore stands essentially static. Under such circumstances, loss of fluids into the surrounding formation must be kept to an absolute minimum in order to maintain consistency of the drilling fluid matrix and to prevent loss of hydrostatic head necessary to control reservoir pressure. During drilling operations when the drilling fluid is constantly circulated, water loss in the range 15 to 50 cc A.P.I. can be tolerated. However, while the drillling fluid column in the well bore is static during tripping and drill stem testing, water loss must be kept to a maximum of 10 cc A.P.I. or less, and the viscosity must be in excess of 45 seconds per quart A.P.I.

The inventors have found that a viscosifier and filtration control agent derived from durum endosperm according to the present invention added to a water based drilling fluid at a ratio of approximately 12 to 15 pounds per barrel provides a viscosity of 32 to 35 seconds per quart A.P.I. and water loss of approximately 3 cc A.P.I. Twenty-five pounds of this additive per barrel of drilling fluid provides viscosity in the range of 45 to 50 seconds per quart A.P.I. and maintains water loss to approximately 1 cc A.P.I. Further, the viscosifier and filtration control additive of this invention is equally effective in both fresh water and salt water based drilling fluids, and contaminated water or salt water has no adverse effect on the extent to which the additive yields or thickens or on the time required for it to do so. Therefore, it is not only much less expensive than bentonite or attapulgite viscosifiers and synthetic polymer viscosifier and filtration control additives, but it has the advantage of superior and fast acting viscosity and filtration control characteristics in salt water based drilling fluids and severely contaminated drilling fluids. No clays are required when the drilling fluid additive according to this invention is utilized in a drilling mud system; therefore, the oil bearing formations in the well are not exposed to damaging foreign clays from the drilling fluid or to fresh water that could have an adverse effect on native clays in the formation.

Figure 2:
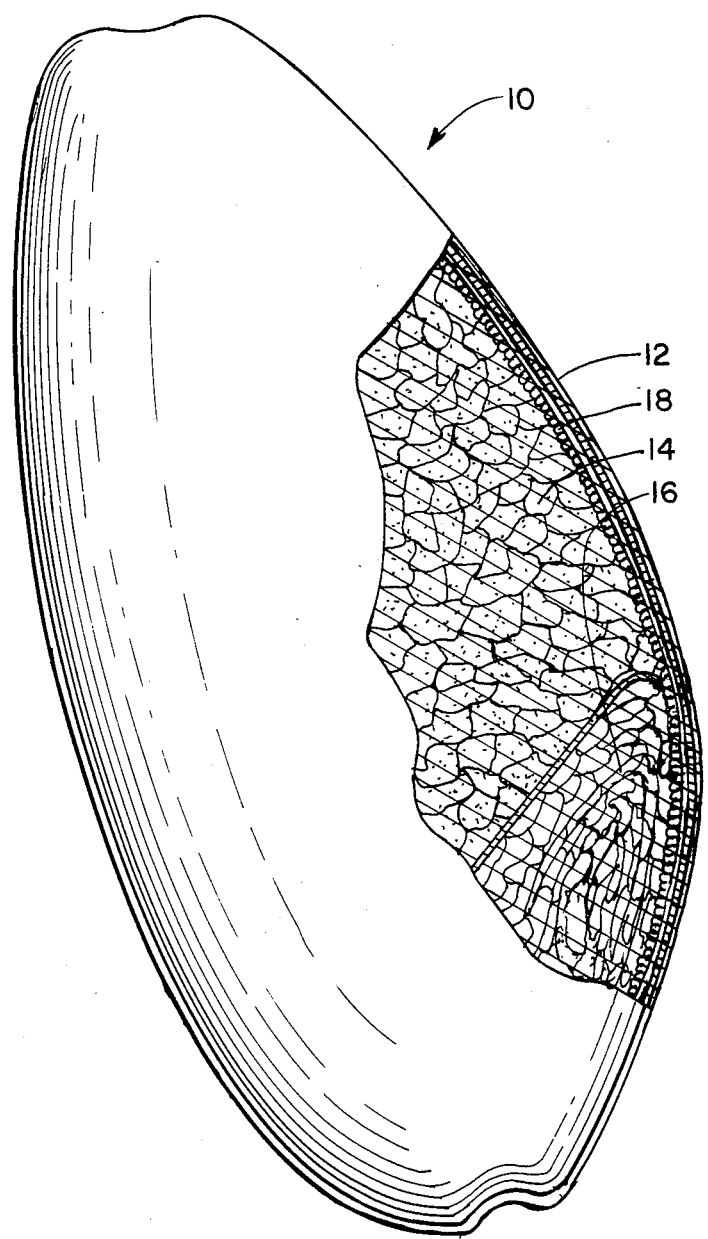
FIG. 2 is an elevation view, in partial cross section, of a kernel of durum.

A ground durum drilling fluid additive of the present invention also has significant advantages over conventional starch drilling fluid additive and alleviates many of the problems which caused starches to fall into disfavor in well drilling operations. The bulk of a durum kernel 10, as illustrated in FIG. 2, is comprised of the endosperm 14, which is a mass of cells filled with starch granules in a protein matrix. The walls of the cells are cellulose. The outermost layer of the endosperm is comprised of a layer of aleurone cells 18. The aleurone cell layer is positioned just under the bran 12 and is very high in protein content. The bran is essentially the outer coating of the kernel and is comprised of laminated layers of nucellar tissue, seed cot or testa, tube cells, cross cells, hypodermis, and epidermis. The germ 16 is in the lower or base portion of the kernel 10.

Starch is a distinct granular structure which swells on heating in a water environment. Such swelling or "yielding" occurs in the range of 175° to 180° F. (79° to 82° C.) and water is absorbed into the cell, which causes the fluid to thicken and become more viscous. As temperature continues to increase, however, the granule eventually breaks down and the matrix turns to a mush having very little viscosity or rheometric flow characterisitics. When such "overcooking" occurs, the starches and soluble proteins leach out, and the starch as a drilling fluid additive loses its effectiveness.

The drilling fluid additive of the present invention, however, is different and much superior to ordinary starch for purposes of viscosifying and controlling filtration in drilling fluids for several reasons. First, it has a much higher concentration of hemicellulose, which is a different form of carbohydrate than normal starch, and which has a very high viscosity. Further, hemicellulose is able to maintain its viscosity even in higher temperature environments. Generally, approximately three to five percent (3 to 5%) of this drilling fluid additive is hemicellulose material.

Also, the drilling fluid additive of the present invention includes a relatively high concentration of protein in addition to the carbohydrates. Durum has a relatively high protein content in general, and the outer portion of the endosperm of durum is higher in protein concentration than the inner portion of the endosperm. Therefore, by utilizing only the outer ten to fifteen percent (10–15%) of the endosperm just under the bran for this drilling fluid additive, a concentration of approximately sixteen to twenty-two percent (16 to 22%) protein is obtained in addition to the carbohydrates in the form of starch, hemicellulose, and other polysaccharides. Since the endosperm is basically comprised of cells filled with starch granules, hemicellulose, and other polysaccharides in a protein matrix, the higher protein concentration of this material provides more structure to the matrix. Also, the protein denatures at higher temperatures and becomes more solid or firm and will not go back into solution. This phenomenon also helps to firm up the protein around the starch molecules and contributes to resistance of this drilling fluid additive to overcooking or turning to a non-viscous mush at high temperatures. Further, organic organisms and bacteria cannot break down protein as fast as starch; therefore, the drilling fluid additive according to the present invention is more resistant to degradation due to consumption by organic organisms than conventional starch drilling fluid additives.

The result is that this drilling fluid additive according to this invention is far superior to starch. It is more viscous than starch, and it maintains its viscosity in higher temperature environments. The high protein matrix also provides excellent filtration control, even without the addition of bentonite or attapulgite clays which usually is required in conventional starch, and it is more resistant to attack by organic organisms.

Another significant advantage of this drilling fluid additive over starches and other drilling fluids that utilize clay as viscosifier and filtration control agents, is that it has a very high lubricity. In fact, it has a lubricity very near that of conventional engine oil. For example, under testing in an extreme pressure machine, a high grade engine oil under 600 in.-lbs. of torque pulls 6.3 amps. This drilling fluid additive with 15 lbs./bbl. according to this invention when tested in the same extreme pressure machine at 600 in.-lbs. of torque drew only 6.4 amps and showed only light wear. In contrast, the same concentration of 15 lbs./barrel of attapulgite clay, when tested in this extreme pressure machine under 600 in.-lbs. of torque pulled 9.5 amps and showed heavy wear. Consequently, the use of this drilling fluid additive is much less abrasive and causes much less wear in pumps, valves and other mechanical equipment utilized on well drilling sites to handle the drilling fluid. Also, less power and fuel consumption is required to drive the pumps than when abrasive clays are used in the drilling fluid.

The required concentration of this drilling fluid additive, of course, depends on the conditions encountered at individual drill sites or individual wells. As an example, however, it has been found that a saturated salt water based drilling fluid having a density of approximately ten lbs./gallon can be brought up to a viscosity of approximately 32 to 35 seconds/quart A.P.I. with only approximately 3 cc A.P.I. water loss by the addition of 12 to 15 lbs./barrel of the ground durum drilling fluid additive of this invention. The addition of 25 lbs./barrel of this drilling fluid additive to a saturated salt water based drilling fluid will yield approximately 45 to 50 seconds/quart A.P.I. viscosity with only 1 cc A.P.I. water loss. This first concentration of 12 to 15 lbs./barrel is considered to provide very adequate viscosity and excellent filtration control for drilling fluid systems in conventional oil well drilling oeprations under relatively low reservoir pressure conditions. The latter concentration of 25 lbs./barrel provides sufficient viscosity and excellent filtration control for static fluid conditions in the well during drill stem testing and for suspending barite in weighted muds for higher reservoir pressure control situations. By contrast, 25 lbs./barrel of attapulgite clay provides approximately the same viscosity, but it gives no water loss or filtration control at all.

The drilling fluid additive of the present invention also is unaffected by highly contaminated salt water. Clay drilling fluid additives, on the other hand, are adversely affected by salt water in that the yield or swelling time is extremely retarded and full effectiveness is not obtained even after 10 to 12 hours. Further, synthetic polymers, available as viscosifier and filtration control agents, do not perform well in salt water that is contaminated by high concentrations of calcium and magnesium, which is encountered in many formations. Conseuently, in addition to being less expensive and more effective as a viscosifier and filtration control agent, the additive of the present invention is a much more universal product that can be used in virtually all fresh water and salt water based mud systems, regardless of the level or mineral contamination.

Of course, as mentioned above, temperatures in excess of 175° to 180° F. are necessary for this drilling fluid additive to yield or thicken. Most oil wells, however, are drilled into subsurface geological strata that have temperatures at least this high, so this temperature requirement is not usually a problem. It is beneficial to be able to initially add the drilling fluid additive of this invention to cold water where it is easy to obtain nearly 100 percent dispersion of the material in the water matrix. Then, as the mixture is introduced into the drilling fluid system and pumped into the high temperature subsurface environment of the well, the effectiveness and efficiency of the yield or thickening is substantially increased over both conventional clay and starch drilling fluid additives. In fact, in some instances where a porous formation is suddenly encountered that leads to high water loss from the drilling fluid matrix, it has been found beneficial to pump a mixture of cold water and the drilling fluid additive of this invention in the form of a plug down the well to a location adjacent the formation into which water is being lost and then allowing the fluid to become static adjacent the formation while the formation temperature increases the temperature of the fluid mixture to the yield point. This process provides an effective, localized, water-loss plug to control the water loss from the drilling fluid matrix while the remaining quantity of the drilling fluid matrix is brought up to sufficient water loss control standards to drill through such a reservoir.

Embodiments of the present invention have been shown and described with a degree of particularity to enable a complete and full understanding of those embodiments. It should be understood, however, that the present invention involves inventive concepts defined in the appended claims, and these inventive concepts are not intended to be limited by the detailed description herein beyond that required by the prior art and as the claims are allowed. The Improved Method and Material for Increasing Viscosity and Controlling Filtration of Oil Well Drilling and Work-Over Fluids of the present invention can take other forms and is susceptible to various changes in detail or structure or method without departing from the principles of this invention.

We claim:

1. Oil well drilling fluid produced by the process of mixing water and a viscosifier and colloidal water loss material, wherein said viscosifier and colloidal water loss material is comprised essentially of the outer layer of the endosperm portion of durum kernels that constitutes approximately 10 to 15 percent of the kernel by weight, and heating the mixture to a temperature of at least 175° to 180° F. (79° to 82° C.).

2. The oil well drilling fluid of claim 1, wherein the ratio of the viscosifier and colloidal water loss material to water is in the range of 10 to 30 pounds of the material per barrel of water.

3. The oil well drilling fluid according to claim 1, wherein said water is a salt water brine solution.

4. The oil well drilling fluid produced according to the process of claim 1, wherein said viscosifier and colloidal water loss material is comprised essentially of durum ground through a screen at least as small as 100 mesh.

5. The process of viscosifying well drilling mud and preventing lost circulation in a well, comprising the steps of mixing ground durum comprising the outer portion of durum endosperm constituting about 10 to 15 percent of the weight of the durum kernels with well drilling mud, circulating the mud and ground durum mixture into a well hole having formtion tempertures in the range of at least 175° to 180° F. (79° to 82° C.), and allowing the heat in the formation to heat the mixture to a temperature range of at least 175° to 180° F. (79° to 82° C.).

6. The process of claim 5, including the step of mixing the ground durum with water at a temperature less than approximately 175° to 180° F. (79° to 82° C.) and then adding the grund durum and water mixture to the well drilling mud.

7. The process of claim 6, including the step of heating the ground durum and water mixture to a temperature greater than 175° to 180° F. (79° to 82° C.) before adding it to the well drilling mud.

8. The method of controlling pressure and fluid loss in, and cleaning debris from, a well during drilling and workover procedures, comprising the steps of mixing the outer portion of the endosperm of durum wheat comprising about 10 to 15 percent of the weight of the durum wheat kernels with a water-based fluid matrix, heating the mixture to a temperature of at lest 175° F. to 180° F. (79° C. to 82° C.), and circulating the mixture into the well.

9. The method of claim 8, including the step of preparing the ground durum by milling it through a screen at least as small as 100 mesh.

10. The process of claim 9, including the step of removing the bran of the durum prior to the step of milling it through the screen.

11. The method of controlling pressure and fluid loss in a well having a formation temperature of at least 175° F. to 180° F. (79° C. to 82° C.), comprising the steps of mixing the outer portion of the endosperm of durum wheat comprising about 10 to 15 percent of the weight of the durum wheat kernels with a water-based fluid matrix, circulating the mixture into the well, and allowing the heat in the formation to heat the mixture to a temperature range of at least 175° to 180° F. (79° C. to 82° C.).

* * * * *